United States Patent

[11] 3,609,693

[72] Inventor Luigino Ferroglio
Ivrea, Italy
[21] Appl. No. 793,108
[22] Filed Jan. 22, 1969
[45] Patented Sept. 28, 1971
[73] Assignee Ing. C. Olivetti & Company S.p.A.
Turin, Italy
[32] Priority Jan. 26, 1968
[33] Italy
[31] 50283-A/67

[54] DATA COMMUNICATION SYSTEM COMPRISING AT LEAST ONE REMOTE STATION AND A PLURALITY OF TERMINAL UNITS
2 Claims, 4 Drawing Figs.

[52] U.S. Cl. .......... 340/152, 340/147 C
[51] Int. Cl. .......... H04j 3/06, H04q 5/00
[50] Field of Search .......... 340/147, 152

[56] References Cited
UNITED STATES PATENTS

| | | | |
|---|---|---|---|
| 3,485,953 | 12/1969 | Norberg .......... | 340/147 X |
| 3,509,538 | 4/1970 | Holden et al. .......... | 340/167 X |

*Primary Examiner*—Donald J. Yusko
*Attorney*—Birch, Swindler, McKie & Beckett

ABSTRACT: A communication system comprising a remote station connected to a plurality of terminal units which are located close to each other, all the units being connected to a line through a single modulation-demodulation unit whose interface towards the terminal units comprises a plurality of channels, each connected to the corresponding channels of all the terminal units, and including a pair of main channels for transmitting information signals from and to the modulation-demodulation unit, a plurality of channels for transmitting control signals from the terminal unit to the modulation-demodulation unit and a plurality of channels for transmitting signals replying to the control signals and other condition indicating signals from the modulation-demodulation unit to the terminal unit.

INVENTOR
LUIGINO FERROGLIO

INVENTOR.
LUIGINO FERROGLIO

DATA COMMUNICATION SYSTEM COMPRISING AT LEAST ONE REMOTE STATION AND A PLURALITY OF TERMINAL UNITS

CROSS REFERENCE TO RELATED APPLICATION

Applicant claims priority from corresponding Italian Pat. application Ser. No. 50283-A/67, filed Jan. 26, 1968.

BACKGROUND OF THE INVENTION

1. Field of the Invention

The present invention relates to a communication system that connects a remote station through a transmission line to a plurality of terminal units which are close to each other.

2. Description of the Prior Art

In known communication systems comprising at least one remote station connected through a transmission line to a plurality of terminal units which are close to each other and adapted to exchange information signals one at a time with said remote station, the terminal units are connected to the transmission line through a plurality of modulation-demodulation units, each terminal unit being associated on a one-to-one basis with a corresponding modulation-demodulation unit. The presence of a modulation-demodulation unit for each terminal unit increases the cost and overall dimensions in known communication systems, which are further maximized in accordance with the number of terminal units located close to each other and connected to a remote station on the same transmission line.

SUMMARY OF THE INVENTION

According to the present invention there is provided a communication system comprising a remote station connected to a plurality of terminal units which are located close to each other, all the units being connected to the line through a single modulation-demodulation unit whose interface towards the terminal units comprises a plurality of channels, each connected to the corresponding channels of all the terminal units, and including a pair of main channels for transmitting information signals from and to the modulation-demodulation unit, a plurality of channels for transmitting control signals from the terminal unit to the modulation-demodulation unit and a plurality of channels for transmitting signals replying to the control signals and other condition indicating signals from the modulation-demodulation unit to the terminal unit.

DETAILED DESCRIPTION OF THE INVENTION

General Organization of the System

Figure 1:
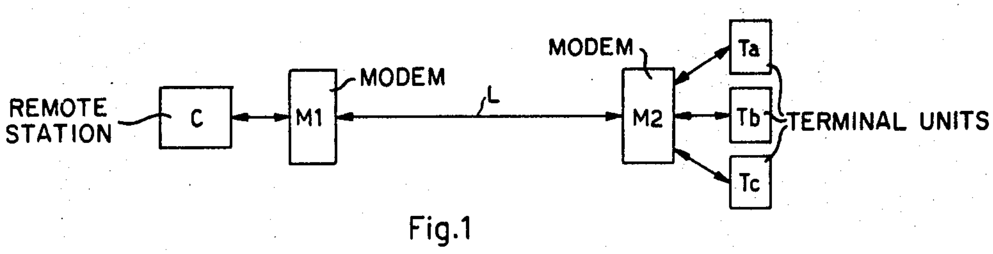
FIG. 1 is a block diagram of a system of communication between a plurality of units connected on the same channel.

In the communication system shown in FIG. 1, remote station C is connected by means of first transmission control unit M1 to transmission line L for communicating with a plurality of terminals T*a*, T*b*, T*c* which are located close to each other and connected to the aforesaid transmission line through second transmission control unit M2. Remote station C comprises for example, a central data processor connected to transmission line L through its own transmission control unit M1 which, in this specific case, may comprise a modulator-demodulator known per se. However remote station C could just as well comprise another terminal unit and the transmission control unit M1 could comprise for example, a concentrator with a plurality of transmission lines leading thereto.

Transmission line L may be a telephone line. The line may have two wires in which case transmission of information in the two directions can only alternate, or the line may have four wires in which case transmission of information in the two directions between the remote station and a terminal station may be simultaneous.

Transmission control unit M2 may comprise a simple modulation-demodulation unit to which there are connected a plurality of adjacent terminal units, of which there are three, T*a*, T*b*, and T*c*, in the specific case illustrated in FIG. 1. The communication system described above in its simplest form may be extended to form a network of connected units disposed in any desired manner. The general organization of the communication system must be such that the exchange of messages along a transmission line takes place between a single transmitting unit and a single receiving unit. That is, terminal units T*a*, T*b*, and T*c* must exchange information signals through transmission line L one at a time with the remote unit (central date processor C). One of the known methods making it possible for the terminal units and the central data processor to exchange information signals one at a time consists of the addressing procedure, in which each terminal unit is assigned an address which distinguishes or marks it and only the reception of its own address enables the terminal unit to transmit.

Conversation Between the Data Processor and Terminal Unit

More particularly, an addressing conversation procedure is described in the specification of our copending Italian Pat. application Ser. No. 43987/68. It is sufficient to note here the basic characteristics of this procedure, which provides that the initiative for each exchange of data be left to the central data processor that controls both the transmission and reception of the various information signals. The conversation procedure can be divided into two parts:

1. Polling procedure for the sending of interrogation messages from the terminal to the processor.

2. Selection procedure for the transmission of reply messages from the processor to the terminal.

The central data processor sends via the transmission line the address of the terminal unit to which it desires to transmit information or from which, on the basis of the information gained in the polling procedure, it desires to receive information. All the terminal units connected to the same transmission line receive the address, but only one terminal unit recognizes the address received as its own and is enabled to receive another transmission of data from the processor or transmit data to the processor. The central processor can send a polling code by means of which it asks the terminal unit whether it has information to send to the processor. If the terminal unit does not have any information to send, it replies with a service code which, having been received, leaves the processor in control of any possible following conversations. If, on the other hand, the terminal unit has information to send, it sends it and, after an error check procedure, leaves full control of the communication system to the central processor.

After the address, the central data processor can send to the interrogated terminal unit a selection code by means of which it asks the terminal unit whether it is able to receive information. If the terminal unit is not able to receive the information, it replies with a service code which, having been received by the processor, compels the processor to reinterrogate the terminal unit at a later time. If the terminal unit interrogated is free to accept information from the processor, it replies to the "selection" request in the affirmative. The central processor, having received the affirmative reply, sends the information data to the terminal unit which, after an error procedure for checking the accuracy of the data received, leaves full control of the communication system to the central processor. This special conversation procedure therefore permits the exchange of messages to take place from time to time between the central processor and a single terminal unit on addressing by the processor itself, so that there is no danger of a plurality of terminal units exchanging information data with the processor simultaneously. It will be clear however from the description that other conversation procedures lend themselves equally well to the relations that may be obtained in a system according to the invention.

Conversation Between Terminal and Modulator-Demodulator (Modem)

The conversation procedure briefly described hereinbefore concerns the control means of the central processor on one hand and of the interrogated terminal unit on the other, and does not concern the logic of the units that connect the processor and the interrogated terminal unit to the line. However, the service and information signals exchanged between processor C and terminal units T*a*, and T*b*, and T*c* pass through the two modulation-demodulation units M1 and M2, the signals being modulated and demodulated only to be adapted to transmission over long distances.

Figure 2A:
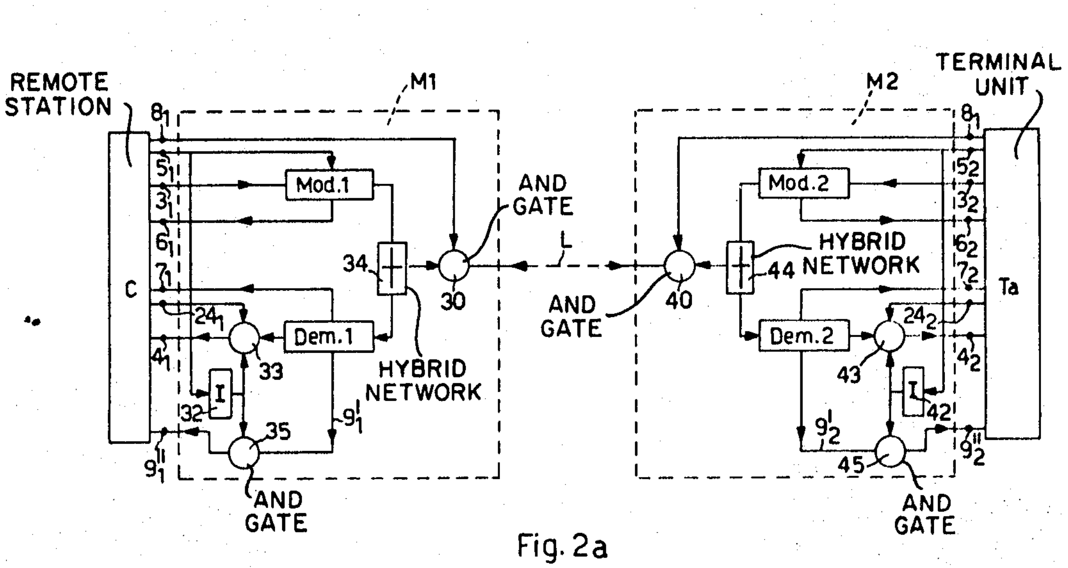
FIG. 2*a* and 2*b* are block diagrams of systems of communication between two units connected on two wires and on four wires, respectively.

Referring to FIG. 2*a*, a remote station or data processor C is connected by means of modulation-demodulation unit or modem M1 to telephone line L for communicating by means of a second modulation-demodulation unit or modem M2 with terminal unit T*a*. The interface between the logic unit and the modulation-demodulation unit (that is, between remote station C and modem M1) may be of the type defined and recommended by the International Telegraph and Telephone Consultative Committee (C.C.I.T.T.) on pages 44 to 57 of the "-Blue Book," Volume VIII, "Data Transmission," published in Nov. 1964 by the International Telecommunications Union. In this recommendation, 28 interface channels are specified between the processing logic unit and the transmission control unit. These can be divided into:

a. a pair of main channels for the transmission of information signals from and to the modulation-demodulation unit;

b. a plurality of channels for transmitting check and control signals from the processing logic unit to the modulation-demodulation unit;

c. a further plurality of channels for transmitting signals replying to the aforesaid check signals and other condition-indicating signals from the modulation-demodulation unit to the logic unit.

In the example being described, the interface between the remote station (processor C) and modem M1 and, similarly, between terminal unit T*a* and modem M2, is constituted by ten channels having the same functions as those channels identified by the same reference numbers that appear in the aforesaid recommendation of the C.C.I.T.T. The ten channels provide both in FIG. 2*a* for connection to two wires and in FIG. 2*b* for connection to four wires represent the following:

1—Protective earth (not shown)
2—Signal earth (that is logic zero—not shown)
3—Input of the digital signals (to the modulator)
4—Output of the digital signals (from the demodulator)
5—Request for transmission
6—Ready to transmit
7—Equipment ready
8—Command for connection of the modem to the line
9—Carrier detector
24—Blocking of reception

Conversation Between the Modem and a Logic Unit

Referring to FIG. 2*a*, when processor C desires to transmit a message to terminal unit T*a*, it sends a "transmission request" signal to modulator Mod. 1 of modem M1 on channel $5_1$. The presence of a signal on channel $5_1$ causes the generation of a carrier by modulator Mod. 1 which, owing the the reactance of the circuits, takes a certain time to reach normal working conditions. When the modulation unit is ready, that is, when the carrier has reached normal working conditions, it transmits a "ready to transmit" signal to processor C on channel $6_1$. Meanwhile, gage 30 is open is a signal is present on channel $8_1$, that is, if there is a signal of "command for connection of the modem to the line" on channel $8_1$. This may either be prearranged manually or generated by processor C after preliminary use of line L; for example, a voice telephonic communication between processor C and terminal unit T*a*, setting up the system for transmission. Let us suppose, however, that the signal on channel $8_1$ is always present; that is, that units C and T*a* are always connected for digital transmission. The "transmission request" signal applied to channel $5_1$ and thus to modulator Mod. 1, is also transmitted, by inverter 32 to gate 33 to block the latter and thus channel $4_1$ which constitutes the "output for the digital signals" from the demodulation unit Dem 1 of the modem.

Gate 33 is blocked because the signals transmitted via channel $3_1$ to modulator Mod. 1 and line L could reenter transmitting logic unit C by demodulator Dem 1 and channel $4_1$, because hybrid network 34 does not distinguish between the signals leaving logic unit C and the signals arriving at the unit. Moreover a second signal is provided on channel $24_1$ and prevents the output of data from channel $4_1$ to processor C forming a "reception block," this second signal being generated by processor C on the transmission of the "transmission request" signal $5_1$. Finally, before the sending of information signals by processor C on channel $3_1$, there must be sent by modem M1 to the processor the channel $7_1$ an "equipment ready" signal which indicates the state of the modem, that is, if it is present, that the modem is ready to operate. After processor C has received the "ready to transmit" signal on channel $6_1$ and the "equipment ready" signal on channel $7_1$, it begins the transmission on channel $3_1$ of the digital information signals, which modulate the carrier generated by the modulator Mod. 1 and, via the transmission line L, are applied to modulation-demodulation unit M2 and, consequently, terminal unit T*a*.

Not shown in the drawing, but present at the interface between Modem M1 and the processor C are another two channels: channel 1 which represents the "protective earth" and channel 2 which represents the "earth," that is it establishes a common reference potential for all interface channels and may be connected to "protective earth." The "-carrier detector" channel $9'_1$ detects the presence of a carrier in the demodulator both during reception and during transmission, because, as has been said hereinbefore, hybrid network 34 does not distinguish the signals leaving Modem M1 from those entering. In the transmitting state, no signal is applied to processor C via channel $9'_1$, because the signal on channel $9'_1$ is blocked by gage 35 because of signal $5_1$, which is the "transmission request " sent by processor C to Modem M1.

At the other end of transmission line L are located modulation-demodulation unit M2 and terminal T*a*, the interface of which is entirely similar to the interface between Modem M1 and processor C. In fact, since gate 40 is always open, on the arrival of a signal from line L the demodulator Dem 2 demodulates it and sends the "carrier detector" signal to terminal T*a* on channel $9'_2$ which feeds channel $9'_2$ beyond free gate 45. As the incoming signal is not blocked by signals $24_2$ and $5_2$, it passes through gate 43 and reaches terminal T*a* on channel $4_2$. The return path of an information signal from terminal unit T*a* to processor C is similar to the reverse path and, thus, the exchange of signals between terminal unit T*a* and modem M2 is also similar to the exchange of signals between processor C and modem M1.

Figure 2B:
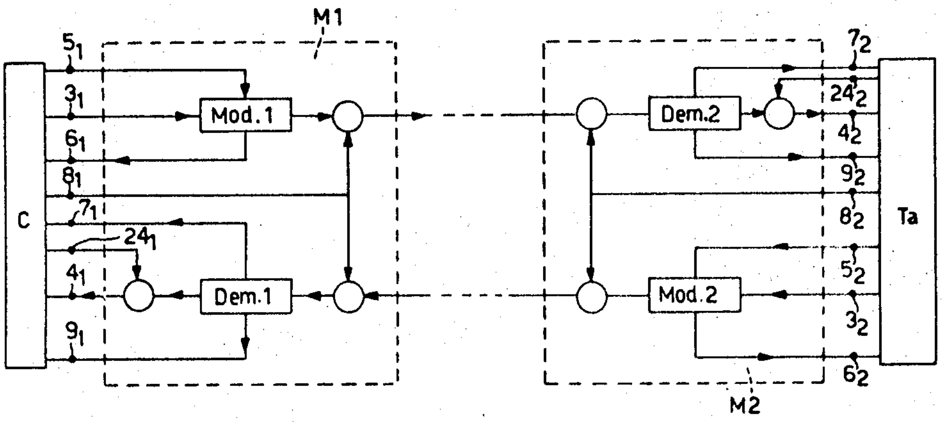

The conversation procedure between the processing logic unit and the modulation-demodulation unit in the case of transmission on four wires is the same as in case of two wires, as shown in FIG. 2*b*. The sole differences with respect to the case in which two wires are used are due to the fact that in the case of four wires the transmission path is completely different from the receiving path. In this case, therefore, it is not necessary for the "transmission request" signal 5 to prevent at the same time the output of the data from the demodulator to the logic unit, because the "reception blocking" signal 24 is sufficient for this purpose. Also, there is no need for signal 5 to obstruct "carrier detector" signal 9, because the only carrier that can be detected by the demodulator is the carrier received from the distant station, the forward and return paths for the communications being separate.

Conversation Between Modem and a Plurality of Terminal Units

According to the invention, in the case where a plurality of adjacent terminals are connected through a transmission line L to one or more remote stations, a single modulation-demodulation unit can be connected on one hand to the transmission line and on the other to the plurality of terminals. The channels entering and leaving the modulation-demodulation unit should comply with the recommendations of the C.C.I.T.T., that is they should be the same as in the case in which the modulation-demodulation unit is connected to a single logic unit.

It is therefore necessary to interpose two groups of circuits between the input and output channels of each terminal unit and the input and output channels of the modulation-demodulation unit connected to them, these groups of circuits having the objects of accepting the signals coming from the separate external logic units and conveying them to the modulation-demodulation unit, and distributing the signals coming from the modulation-demodulation unit to all of the separate logic units.

As has been explained, the terminal units connected to the modulator-demodulator must be able to exchange the signals with the aforesaid modem one at a time in accordance with the conversation procedure between the terminal units and the remote station processor, of which an example has been given hereinbefore.

Figure 3:
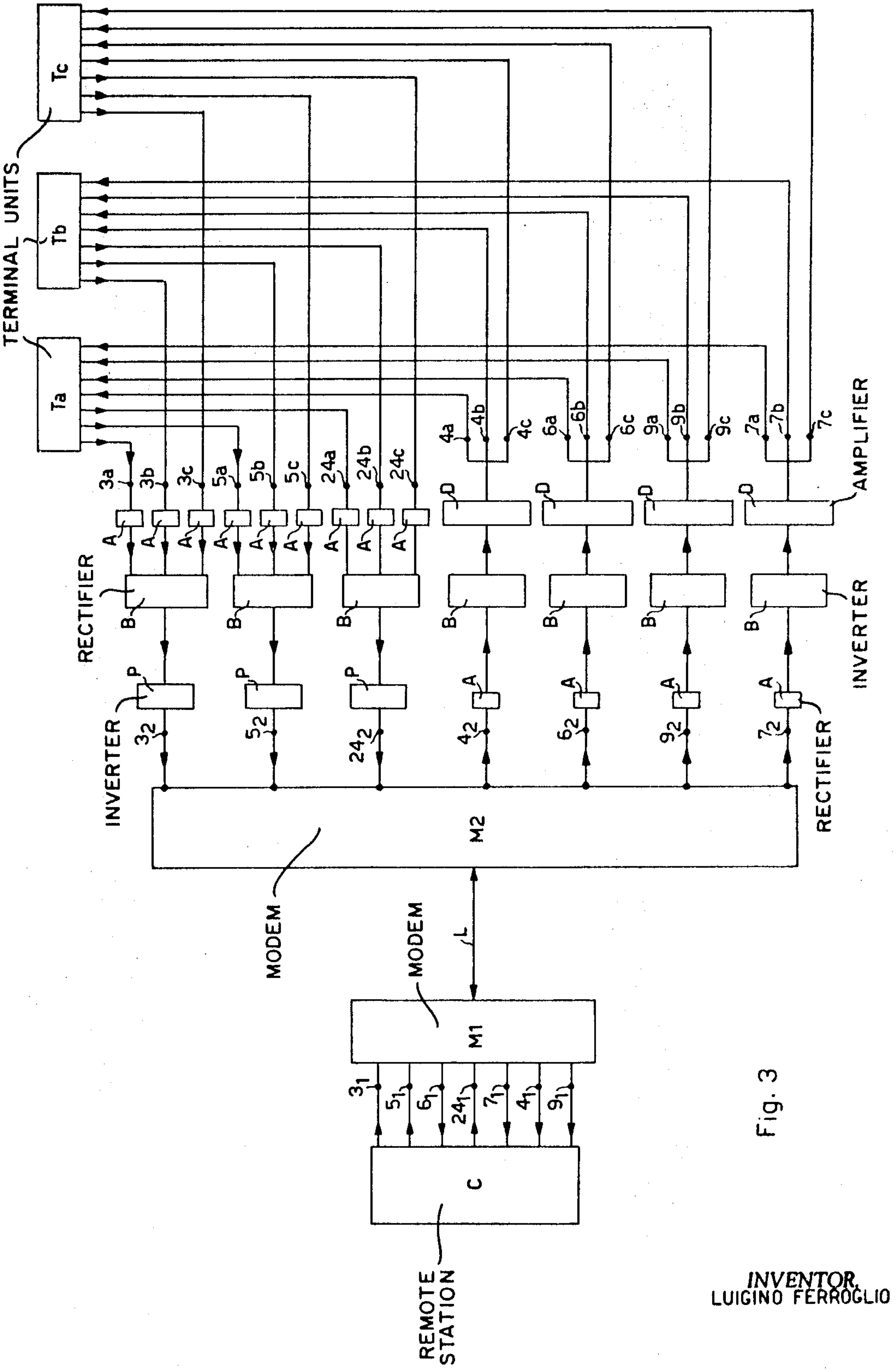
FIG. 3 is a block diagram of a system embodying the invention of communication between a remote station and three terminal stations which are close to each other in a two-wire connection.

More particularly, referring to FIG. 3, assume that a data processor C is connected through modem M1 and the two-wire transmission line L to a single modem M2 at which three terminal units T*a*, T*b*, and T*c* converge. Assume, moreover, that the signal 8 of "command for connection of the modem to the line" is always present, that is the two modems M1 and M2 are always connected. Of course, all the interface signals comply with the standards of the C.C.I.T.T. relating to levels, polarity, impedances, capacitive loads, etc. Some circuit elements therefore only have the purpose of adapting the logic signals to these special requirements.

When processor C desires to send a message to one of terminals T*a*, T*b*, and T*c*, it sends the "transmission request" signal $5_1$ to modem M1. When the carrier generated by modem M1 is operating normally, the modem sends "ready to transmit" signal $6_1$ to processor C. The "transmission request" signal $5_1$ blocks both the output of the digital signals from modem M1 to the processor C and the "carrier detector" signal $9_1$, as described above.

Moreover, there is provided on channel $24_1$ a "reception blocking" signal which is generated by processor C on the sending of signal $5_1$. If modem M1 is ready to operate, it sends an "equipment ready" signal $7_1$ to processor C. After this exchange of interface signals, which is entirely similar to that hereinbefore described, processor C sends the main information signals on channel $3_1$ to modem M1 so that they may be modulated and sent to line L. The messages must be addressed so that they reach the desired terminal unit from among the terminal units connected. More particularly, assume that the first character which reaches modem M2 is the address of terminal unit T*b*. The reception of the carrier by modem M2 causes the generation of "carrier detector" signal $9_2$ and, from modem M2, signal $9_2$ is distributed, first via circuit A which eliminates the negative polarities and then via circuit B which has the sole function of reversing the polarity and finally via power amplifier D which also has the function of restoring the signal between positive and negative polarity, in accordance with the standards of the C.C.I.T.T., to all the terminal units; signal 9*a* to terminal unit T*a*, signal 9*b* to terminal unit T*b* and signal 9*c* to terminal unit T*c*. There is no signal on the remaining six channels entering and leaving modem M2.

The address of the terminal unit sent by processor C is demodulated by modem M2 and arrives on channel $4_2$ via circuits A, B and D, after being distributed to channels 4*a*, 4*b*, and 4*c*, at the three terminal units T*a*, T*b*, and T*c*, respectively. Only terminal unit T*b* recognizes the aforesaid address as its own and sends to processor C, in replay, a signal of assent to the conversation or of refusal. To do this, it sends the "transmission request" signal 5*b* which arrives on channel $5_2$ at modem M2, first via circuit A which eliminates the negative polarities, then via circuit B which reverses the polarities and finally via another reversing circuit P. When the carrier generated by modem M2 is operating normally, this modem sends the "ready to transmit" signal $6_2$, which goes back to terminal unit T*b*, via circuits A, B and D, on channel 6*b*. As has already been said, signal $5_2$ blocks both channel $4_2$ for the "output of the digital signals" and the "carrier detector" channel $9_2$. On the sending of signal 5*b* by terminal unit T*b*, this terminal sends the "reception blocking" signal 24*b* which, via circuit A and two circuits B and P, reaches modem M2 on channel $24_2$ to prevent any output on channel $4_2$. If modem M2 is ready to operate, it sends on channel $7_2$ an "equipment ready" signal which, via circuits A, B and D, reaches terminal unit T*b* on channel 7*b*. After this exchange of interface signals, terminal unit T*b* transmits the main information signals on channel 3*b* and, after passing through circuits A, B and P, these signals reach modem M2 on channel $3_2$ and, after being modulated, are sent to processor C through transmission line L.

I claim:

1. A data communication system comprising a remote station connected through a transmission line to a plurality of terminal units which are close to each other, and means connecting said terminal units to said transmission line through an interface unit including for each one of said terminal units a pair of main channels for the transmission of information signals to and from said connecting means, a control channel for transmitting control signals from the terminal unit to said connecting means and a reply channel for transmitting signals replying to said control signals from said connecting means to the terminal unit, in accordance with a predetermined conversation procedure wherein the improvement comprises:

a single modulation-demodulation unit coupled to said plurality of terminal units, the channels corresponding to each of said terminal units being connected to a single input of said modulation-demodulation unit and there through to said transmission line, said remote station being adapted to transmit to said modulation-demodulation unit an address to identify a terminal unit of said plurality of terminal units to be selected, said modulation-demodulation unit including means for sending the received selecting address simultaneously to each of said terminal units through one of said pair of main channels, each one of said terminal units being adapted to recognize the selecting address and to establish said conversation procedure through the pair of main channels and control and reply channels coupled between said modulation-demodulation device and upon recognition by the selected terminal unit of the selecting address received by said modulation-demodulation unit.

2. A system as claimed in claim 1, wherein said modulation-demodulation unit includes a modulation device connected to one of said main channels connected to each of said terminal units, a demodulation device connected to the other main channel of each of said terminal units, and inhibiting means connected to the control channel of each of said terminal units and responsive to a transmission request signal for inhibiting all of said plurality of terminal units from receiving message transmitted to said remote station.